United States Patent [19]

Bauer

[11] Patent Number: 4,460,854
[45] Date of Patent: Jul. 17, 1984

[54] CONTROL DEVICE FOR A VIBRATING ARMATURE MOTOR

[75] Inventor: Anton Bauer, Kelkheim, Fed. Rep. of Germany

[73] Assignee: Braun Aktiengesellschaft, Kronberg, Fed. Rep. of Germany

[21] Appl. No.: 427,348

[22] Filed: Sep. 29, 1982

[30] Foreign Application Priority Data

Oct. 5, 1981 [DE] Fed. Rep. of Germany ....... 3139523

[51] Int. Cl.³ .................... H02K 33/00; H02K 33/02
[52] U.S. Cl. .................................. 318/114; 318/129; 318/130; 318/124; 318/128; 310/29
[58] Field of Search ............... 318/114, 124, 126, 127, 318/128, 129, 130, 131, 132, 133; 310/15, 38, 29, 30; 30/45

[56] References Cited

U.S. PATENT DOCUMENTS

| 3,129,366 | 4/1964 | Fry ........................................ 318/114 |
| 3,480,848 | 11/1969 | Church ............................. 310/29 X |
| 3,922,589 | 11/1975 | Peckingham ...................... 318/126 |
| 4,122,378 | 10/1978 | Brown ................................. 318/128 |
| 4,392,092 | 7/1983 | Gassner ............................... 318/127 |

FOREIGN PATENT DOCUMENTS

| 2323494 | 11/1974 | Fed. Rep. of Germany . |
| 2336759 | 2/1975 | Fed. Rep. of Germany . |
| 1613221 | 7/1975 | Fed. Rep. of Germany . |
| 2753749 | 6/1979 | Fed. Rep. of Germany . |
| 1322178 | 7/1973 | United Kingdom . |

Primary Examiner—B. Dobeck
Assistant Examiner—Paul S. L. Ip
Attorney, Agent, or Firm—Robert A. Shack

[57] ABSTRACT

A vibrating armature motor, which includes a voltage source, an armature, an electromagnet having at least one exciter coil disposed adjacent the armature, a spring for rotationally biasing the armature, a sensor element for sensing the rotational velocity of the armature and for generating a signal proportional to the sensed velocity, a variable duty cycle pulse generator for generating a stream of triggering pulses, the duty cycle of the triggering pulses being dependent upon the sensor signal, and an electronic switch for controlling the current flow from the voltage source through the exciter coil in response to the triggering pulses.

13 Claims, 2 Drawing Figures

CONTROL DEVICE FOR A VIBRATING ARMATURE MOTOR

BACKGROUND OF THE INVENTION

1. Field of the Invention

This invention relates to a control device for a vibrating armature motor with a polarized or unpolarized vibrating armature. Together with at least one spring that is coupled thereto and that is supported on a contact surface of motor housing, this forms a mechanically vibrating system. Its poles are disposed in front of poles of an electromagnet that has two exciter coils and that is connected with an AC voltage source. It is used especially for vibrator motors in dry shaving devices, massage devices, and the like.

2. Background of the Invention

Electromagnetic vibrating armature motors are used to drive appropriate electric devices such as dry shaving devices, massaging devices, vibrators, and the like, on account of their simple, collectorless, and extremely robust structure, and on account of the easy utilization of their oscillating back-and-forth motion.

An electromagnetic vibrating armature motor, of the type mentioned in the introduction, for shaving devices, ringing devices, or the like, is known from the German Offenlegungsschrift No. 23 23 494. It consists of a pivotable armature, which is mounted about a point, and which is polarized or unpolarized. The poles of the armature are opposite the poles of an electromagnet which has two or three legs, and which serves as the stator. In this familiar arrangement, the electromagnet is excited by alternating current. Thus, the armature which is connected by springs with the outer housing is pulled circularly in one direction by the attractive force of the stator or the electromagnet and is pushed through a guidance lever in the opposite direction, so as to drive an element, for example, a shear blade, back and forth. The springs which are fastened at the armature serve to fix the center position of the vibrating armature and to compensate the mass reactive power. The vibration amplitude is determined by the shape of the pole and by the driving power or by the load. From German Offenlegungsschrift No. 23 36 759, an AC vibrating armature motor for dry shaving units is known, whose vibrating armature, together with at least one spring coupled thereto, forms a mechanically vibrating system, whose resonance frequency can be changed for matching to the frequency of 50 or 60 Hz,,, depending on the particular operating voltage that has been applied. With this well-known vibrating armature motor, baseplate has a bearing pin for a vibrating armature, which is provided with a magnetic yoke that swings back and forth before the pole shoes of the electromagnetic core which carries the driving coils. At the vibrating armature, a helical pressure spring grips each side respectively. For matching the well-known vibrating armature to voltages of different frequency, i.e. for the corresponding modification of the resonance frequency of the mechanically vibrating system, a spring with a progressive spring characteristic has been provided, and the vibrating armature motor can be changed over by changing the starting position of the vibrating armature with respect to the stator.

These known vibrating armature motors are usually operated by series or parallel circuits of the exciter coils of the electromagnet which serves as the stator and an AC voltage source of 220 volts or 110 volts. For this purpose, a switchover device is provided, by means of which the unit can be operated at a line voltage of 110 volts by a parallel connection of the exciter coils, and can be operated at a line voltage of 220 volts by a series connection of the exciter coils. However, if this switchover is accidentally forgotten, the unit can be destroyed through overheating, in a very short time, if it is mistakenly connected in parallel but operated at an AC voltage of 220 volts. As discussed above, the full operating power of the vibrating armature motor is achieved only when the vibrating armature is excited approximately at the mechanical resonance frequency of the vibrating structure. Consequently, if the unit is tuned to a line frequency of 50 Hz, but is operated at 60 Hz, or vice versa, the vibrational amplitude will be insufficient. The switchover device provided for this purpose in the device described in German Offenlegungsschrift No. 23 36 759 likewise requires a specific switchover of the unit to the frequency of the AC current supplied. However, the user may not always effect this switchover, so that the power delivered by the device will not correspond to its full rated power.

SUMMARY OF THE INVENTION

An object of the present invention is to create a control device for a vibrating armature motor with a polarized or unpolarized vibrating armature, which makes it possible to operate the vibrating armature motor at all customary line voltages and nearly arbitrary frequencies, without the device that is being operated with the vibrating armature motor having to be switched over and without restricting the available power of the vibrating armature motor.

According to the invention, this aim is achieved as follows: Between the housing-side contact surface and the spring, there is arranged a pressure sensor, which delivers to a square-wave generator a voltage proportional to the pressure exerted on the sensor. The output pulses of the square-wave generator are applied to the base of a switching transistor. The collector-emitter line of this switching transistor is connected in series to the exciter coils and to a rectifier device that is connected with the AC voltage source.

The control device according to the invention makes it possible to operate the vibrating armature motor at all customary line voltages and at nearly arbitrary frequencies without changing over the exciter coils or modifying the vibrating system and without any restriction on the available power.

An advantageous design of the inventive solution is characterized as follows: The pressure sensor is connected through an impedance converter or amplifier stage and a rectifier to the input of the square-wave generator. Here, a smoothing capacitor is connected at the input of the square-wave generator on the one hand and to the ground potential on the other hand. The squarewave generator delivers square vibrations at essentially constant frequency but with a changeable pulse-duty factor.

This design of the inventive solution makes it possible to build a simple and cheap control circuit, using standardized components, to feed the exciter coils of the electromagnet. A further design of the inventive solution is characterized as follows: The square-wave generator consists of a saw-tooth generator and a trigger stage. Thus, by superposing the sawtooth voltage with the regulation DC voltage which is delivered by the rectifier and which is present at the input of the square-wave generator, the use of the triggering can be modified.

These embodiments of the inventive solution make it possible, by an appropriate change of direction or poling of the control voltage, with increasing amplitude of the vibrating armature, to delay the onset of triggering. In this fashion, the switch-on time of the switching transistor is shortened and thus, beginning at a certain amplitude of the vibrating armature, a further amplitude rise is prevented. The inventive control device here also counteracts an amplitude decline, however, as the load increases, since, in this case, the exciter coils are connected to a larger voltage-time surface as a consequence of the extended switch-on time with the switching transistor, so that, on the average, current flows to the exciter coils for a longer time.

A piezo-electric wafer is suitable as the pressure sensor. One terminal of this piezo-electric wafer is connected with the ground potential and the other terminal is connected with the input of the impedance converter and amplifier stage. However, other actual-value transducers are also possible, inasmuch as they fulfill the presupposition that they deliver a voltage which corresponds to the respectively prevailing pressure. Here, the dependence of the delivered voltage on the particular prevailing pressure can be arbitrary, but an appropriate adaptation can be made by means of the electronic control circuit.

These and other features of the invention will be made clear through a description of a preferred embodiment, reference being had to the accompanying drawings, wherein:

DESCRIPTION OF THE PREFERRED EMBODIMENT

Figure 1:
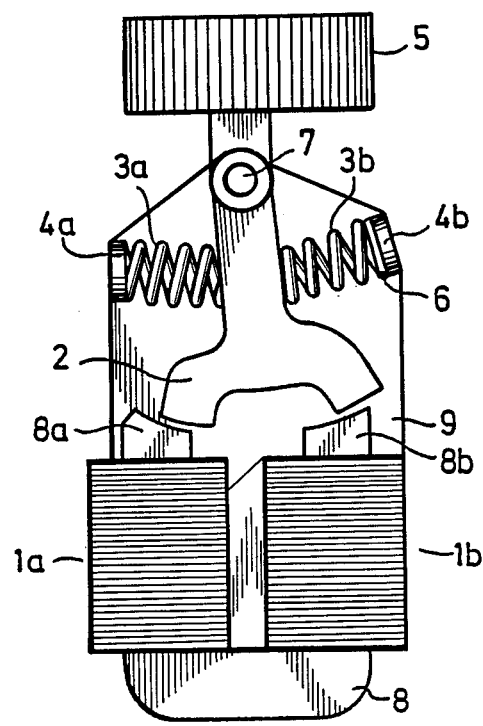
FIG. 1 is a schematic representation of a dry shaving device equipped with a vibrating armature motor.

FIG. 1 shematically shows a top view of a vibrating armature motor for driving a dry shaving device. A bearing pin 7 for a vibrating armature 2 is provided in a housing 9. Bearing pin 7 is connected with a blade block 5, which is moved back and forth below a shearing foil that is not shown in more detail. Armature 2 is mounted for oscillatory movement on bearing pin 7. The vibrating armature 2 swings back and forth in front of the pole shoes 8a and 8b of an electromagnet 8, which carries exciter coils 1a and 1b. Helical springs 3a and 3b are respectively provided on both sides of the vibrating armature 2. These springs are supported against solid abutments 4a and 4b respectively, which are formed from continuations of the housing 9.

According to one aspect of the invention, one abutment 4b of one of the two springs 3a or 3b respectively, is used for the purpose of acquiring the actual occurring pressure changes, which stand in a proportional ratio to the amplitude of the vibrating armature. These pressure changes are the actual values of a control quantity. For this purpose, a pressure sensor 6 always delivers a voltage proportional to the prevailing pressure. For example, wafers of piezo-electric material are suitable for the pressure sensor 6. At their terminals, such wafers deliver a voltage proportional to the pressure. However, other forms of a pressure sensor 6 are also possible, which optionally can deliver a voltage proportional to the pressure or even a voltage inversely proportional to the pressure. In both cases, it is possible to appropriately evaluate the acquired actual value by an appropriate matching circuit in the control circuit.

Figure 2:
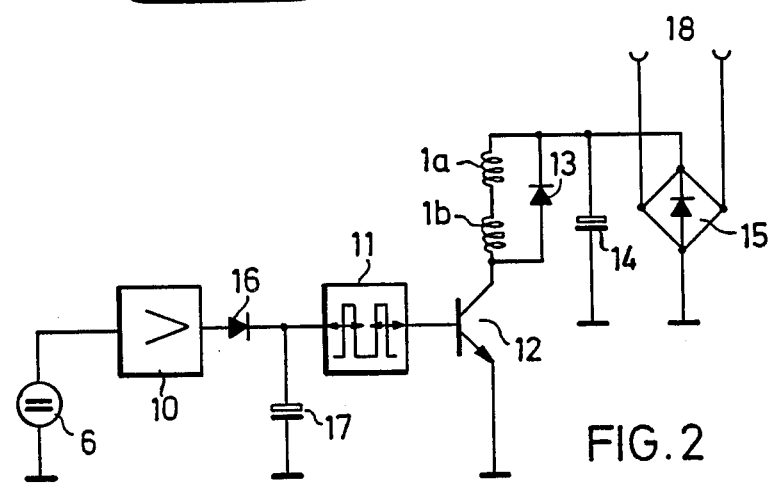
FIG. 2 is a schematic circuit diagram of the control circuit according to a invention.

The control circuit, which is shown in FIG. 2, comprises the pressure sensor 6, one of whose terminals is connected with the ground potential and the other of whose terminals is connected with the input of an impedance converter of amplifier stage 10. The output of the impedance converter of amplifier stage 10 is connected with the anode of a series-connected diode 16. The cathode of the diode 16 is connected both with a smoothing capacitor 17 and with the input of a series-connected frequency-stable square-wave generator 11, whose pulse-duty factor is variable, however. The second terminal of the smoothing capacitor 17 is likewise connected to ground. The output of the square-wave generator 11 is connected with the base of a series-connected switching transistor 12, whose collector is connected in series with the two series-connected exciter coils 1a and 1b at the output of a diode bridge 15. The emitter of transistor 12 is connected to ground potential. A diode 13 is connected in parallel to the series-connected exciter coils 1a and 1b. The anode of diode 13 is connected to the collector of the switching transistor 12. Diode 13 serves to demagnetize the exciter coils 1a and 1b.

The diode bridge 15 is connected on the AC side to the feeding AC network 18. The rectified AC voltage is smoothed by means of a further smoothing capacitor 14, which is connected in parallel with the DC voltage terminals of the diode bridge 15, so that a nearly constant DC voltage is present at the series circuit of the exciter coils 1a and 1b with the collector-emitter line of the switching transistor 12. The square-wave generator 11, for example, can consist of a sawtooth generator in combination with a trigger stage. By superposing the sawtooth curve with the DC control voltage delivered by the impedance converter or amplifier stage 10 or respectively by the rectifier and smoothing stage 16, 17, the deployment of the triggering is variable. In this fashion, variously large voltage blocks can be delivered by the square-wave generator 11. Here, the respective pulse-duty factor is determined by the actual value of the control voltage. Corresponding to the voltage delivered by the square-wave generator 11, the base of the switching transistor 12 is then activated, so that the switching transistor 12 remains switched through or respectively blocked for a variable length of time, corresponding to the control voltage present at its base.

The mode of functioning of the control circuit according to the invention will be explained in more detail below.

The output voltage delivered by the pressure sensor 6 is conducted to the impedance converter or amplifier stage 10 and is subsequently rectified and smoothed. By means of this DC voltage, which is approximately proportional to the vibrational amplitude of the vibrating armature 2, i.e. by means of the actual value of the control voltage, the frequency-stable square-wave generator 11 which, however, is variable in its pulse-duty factor, can be controlled. As already explained above, this square-wave generator can consist of a sawtooth generator in combination with a trigger stage, so that, by superposing the sawtooth curve with the controlled DC voltage, the deployment of the triggering is variable.

By an appropriate change of direction or poling of the regulating DC voltage, as the amplitude of the vibrating armature 2 increases, the trigger deployment is delayed, i.e. the pulse-duty factor is reduced, and thus the switch-on time of the switching transistor 12 is shortened. Starting at a particular vibrational amplitude of the vibrating armature 2, a further amplitude rise is thus prevented. The control circuit also counteracts an amplitude decline as the load increases since, in this case, the exciter coils 1a and 1b have current flowing through them for a longer time as a consequence of extending the switch-on time of the switching transistor 12, and thus coils 1a and 1b receive more driving power.

As is easily seen from this representation, another switching element can also be used in place of the switching transistor 12. It is only necessary that the switching element used can follow the voltage changes at its control terminal fast enough.

In order that the mechanically vibrating system can be operated at its resonance frequency and thus at its maximum efficiency without compensation, the frequency-specifying circuit component, for example the sawtooth generator of the square-wave generator 11, can be synchronized with the amplified AC voltage derived from the pressure sensor 6. For this purpose, the steeper phase response in the resonance region, between the exciting force and the amplitude of the vibrating armature 2, is utilized.

The applicability of the control circuit is not limited only to unpoled driving systems but is also suitable for poled systems, i.e. systems with a premagnetization, for example, by permanent magnets. In that case, however, a push-pull switch is necessary in place of the simple switching transistor 12.

The inventive control circuit is also suitable for stabilizing the amplitude of the vibrating armature 2 of vibrating armature motors by phase-angle control, by means of thyristors or triacs, with respect to line voltage differences at the feeding AC network 18 or with respect to corresponding load changes. In such cases, however, one is bound with the mechanical tuning to the line frequency of the feeding AC voltage network 18.

I claim:

1. A vibrating armature motor, comprising:
   a voltage source;
   an armature;
   an electromagnet having at least one exciter coil disposed adjacent said armature;
   biasing means for rotationally biasing said armature;
   sensor means for sensing the velocity of said armature and for generating a sensor signal proportional to said sensed velocity;
   variable duty cycle pulse generating means for receiving said sensor signal and for generating a stream of triggering pulses, the duty cycle of said triggering pulses being dependent upon the characteristics of said sensor signal; and
   electronic switch means for receiving said triggering pulses and for controlling the flow of current from said voltage source and through said exciter coil in response to said triggering pulses.

2. A motor according to claim 1, wherein said voltage source is an AC voltage source and further comprising: amplifying and rectifying means electrically interposed between said sensor means and said pulse generating means for receiving said sensor signal and for generating, in response thereto, an amplified and rectified version of said sensor signal; and filter means for filtering said amplified and rectified version of said sensor signal.

3. A motor as in claim 2, wherein said amplifying and rectifying means comprises an impedence converter or amplifier and a diode, said impedence converter or amplifier and said diode being connected in series with said sensor means, and wherein said filter means comprises a capacitor connected in parallel with said series circuit of said sensor means, said impedence converter or amplifier and said diode.

4. A motor according to claim 1, wherein said pulse generating means includes means for generating a stream of pulses having a substantially constant frequency and a duty factor variable according to the characteristics of said sensor signal.

5. A motor as in claim 3, wherein said pulse generating means includes means for generating a stream of pulses having a substantially constant frequency and a duty factor variable according to the characteristics of said sensor signal.

6. A motor according to claim 4, wherein said pulse generating means comprises a square-wave generator.

7. A motor according to claim 5, wherein said pulse generating means comprises a square-wave generator.

8. A motor as in claim 6, wherein said square-wave generator includes a sawtooth generator, a trigger stage and means for superposing the sawtooth voltage generated by said sawtooth genertor with the rectified sensor signal from said diode to vary the triggering of said transistor.

9. A motor as in claim 7, wherein said square-wave generator includes a sawtooth generator, a trigger stage and means for superposing the sawtooth voltage generated by said sawtooth generator with the rectified sensor signal from said diode to vary the triggering of said transistor.

10. A motor according to claim 1, wherein said voltage source is an AC voltge source and further including:
    a rectifying bridge connected to said AC voltage source; and
    a smoothing capacitor connected in parallel with the DC supply terminals of said rectifying bridge.

11. A motor according to claim 1, wherein said voltage source is an AC voltage source and further comprising:
    a rectifying bridge connected across said AC voltage source and across said exciter coil; and
    a diode connected in parallel to said exciter coil, the cathode of said diode being connected to said rectifying bridge.

12. A motor according to claim 3, wherein said sensor means comprises a pressure sensor.

13. A motor according to claim 11, wherein said pressure sensor includes a piezoelectric element having a first terminal connected to said impedence converter or amplifier and a second terminal connected to a common ground terminal.

* * * * *